United States Patent
Hirokubo (10) Patent No.: US 12,112,491 B2
(45) Date of Patent: Oct. 8, 2024

(54) SPECTROMETRY METHOD, SPECTROMETRY SYSTEM, AND COMPUTER PROGRAM

(71) Applicant: SEIKO EPSON CORPORATION, Tokyo (JP)

(72) Inventor: Nozomu Hirokubo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 322 days.

(21) Appl. No.: 17/556,202

(22) Filed: Dec. 20, 2021

(65) Prior Publication Data

US 2022/0198687 A1   Jun. 23, 2022

(30) Foreign Application Priority Data

Dec. 22, 2020 (JP) ................. 2020-212189

(51) Int. Cl.
*G01J 3/28* (2006.01)
*G06T 7/33* (2017.01)
(Continued)

(52) U.S. Cl.
CPC .............. *G06T 7/33* (2017.01); *G01J 3/2823* (2013.01); *G06T 7/37* (2017.01); *G06T 7/73* (2017.01);
(Continued)

(58) Field of Classification Search
CPC .... G06T 7/33; G06T 7/37; G06T 7/73; G06T 2207/10152; G06T 2207/10016; G06T 2207/30148; G01J 3/2823; G01J 3/0208; G01J 3/0264; G01J 3/027; G01J 3/0283; G01J 3/10; G01J 3/26; G01J 3/28; G01J 2003/1265; G06V 10/58
See application file for complete search history.

(56) References Cited

U.S. PATENT DOCUMENTS 7,568,800 B2   8/2009  Mihashi et al.
11,209,312 B2  12/2021 Aiso
(Continued)

FOREIGN PATENT DOCUMENTS

JP   2007330558 A   12/2007
JP   2014173919 A   9/2014
(Continued)

OTHER PUBLICATIONS

Office Action for JP Patent Application No. JP2020212189, issued on Apr. 30, 2024, 6 pages of Office Action.

*Primary Examiner* — Aaron W Carter
*Assistant Examiner* — Kathleen M Broughton
(74) *Attorney, Agent, or Firm* — Pramod Chinatalpoodi (57) ABSTRACT

Provided is a spectrometry method that includes (a) identifying a common feature between a first spectral image and at least one second spectral image other than the first spectral image of a plurality of spectral images acquired by an imaging element, (b) detecting a relative position shift amount between the first spectral image and the second spectral image, and (c) aligning the first spectral image and the second spectral image based on the relative position shift amount being detected. The aligning of (c) includes correcting a position of the second spectral image with respect to a position of the first spectral image based on the common feature.

4 Claims, 9 Drawing Sheets

(51) Int. Cl.
  *G06T 7/37*   (2017.01)
  *G06T 7/73*   (2017.01)
  *G06V 10/58*  (2022.01)

(52) U.S. Cl.
  CPC .... *G06V 10/58* (2022.01); *G06T 2207/10152* (2013.01)

(56) References Cited

U.S. PATENT DOCUMENTS

| | | | |
|---|---|---|---|
| 2008/0007691 A1 | 1/2008 | Mihashi et al. | |
| 2008/0317307 A1* | 12/2008 | Lu | G01N 24/08 382/128 |
| 2014/0253924 A1 | 9/2014 | Sano | |
| 2020/0309599 A1 | 10/2020 | Aiso | |

FOREIGN PATENT DOCUMENTS

| | | | | |
|---|---|---|---|---|
| JP | 2020091256 A | 6/2020 | | |
| JP | 2020159862 A | 10/2020 | | |
| WO | WO-2020203853 A1 * | 10/2020 | | G01J 11/00 |

* cited by examiner

SPECTROMETRY METHOD, SPECTROMETRY SYSTEM, AND COMPUTER PROGRAM

The present application is based on, and claims priority from JP Application Serial Number 2020-212189, filed Dec. 22, 2020, the disclosure of which is hereby incorporated by reference herein in its entirety.

BACKGROUND

1. Technical Field

The present disclosure relates to a spectrometry method, a spectrometry system, and a computer program.

2. Related Art

For example, JP-A-2014-173919 discloses a technique in which a plurality of spectral images are acquired using a spectrometer to calculate spectral data at a desired position. As a method of aligning the plurality of spectral images, for example, a pattern that is the same in a reference image and in the alignment image to be aligned is extracted.

Nevertheless, there is a problem in that there are cases in which the same pattern cannot be acquired in the reference image and the alignment image, and thus the plurality of spectral images cannot be aligned.

SUMMARY

A spectrometry method in which the spectrometer includes a spectral element configured to change a wavelength of light to be selected and configured to disperse light from a target object and an imaging element configured to receive light dispersed into a plurality of wavelengths by the spectral element to acquire a plurality of spectral images includes (a) identifying a common feature between the first spectral image and at least one second spectral image other than the first spectral image of the plurality of spectral images acquired by the imaging element, (b) detecting a relative position shift amount between the first spectral image and the second spectral image, and (c) aligning the first spectral image and the second spectral image based on the relative position shift amount being detected. The aligning of (c) includes correcting a position of the second spectral image with respect to a position of the first spectral image based on the common feature. An interval between a center wavelength of a first transmission peak of the light corresponding to the first spectral image and a center wavelength of a second transmission peak of the light corresponding to the second spectral image is no more than twice a first full width at half maximum of the first transmission peak or a second full width at half maximum of the second transmission peak.

A spectrometry system includes a spectral element configured to change a wavelength of light to be selected and configured to disperse light from a target object, an imaging element configured to receive light dispersed into a plurality of wavelengths by the spectral element to acquire a plurality of spectral images, and one or a plurality of processors configured to execute (a) identifying a common feature between the first spectral image and at least one second spectral image other than the first spectral image of the plurality of spectral images acquired by the imaging element, (b) detecting a relative position shift amount between the first spectral image and the second spectral image, and (c) aligning the first spectral image and the second spectral image based on the relative position shift amount being detected. The aligning of (c) includes correcting a position of the second spectral image with respect to a position of the first spectral image based on the common feature. An interval between a center wavelength of a first transmission peak of the light corresponding to the first spectral image and a center wavelength of a second transmission peak of the light corresponding to the second spectral image is no more than twice a first full width at half maximum of the first transmission peak or a second full width at half maximum of the second transmission peak.

A non-transitory computer-readable storage medium storing a program for causing one or a plurality of processors including a spectral element configured to change a wavelength of light to be selected and configured to disperse light from a target object, and an imaging element configured to receive light dispersed into a plurality of wavelengths by the spectral element to acquire a plurality of spectral images to execute a spectrometry method. The spectrometry method includes (a) identifying a common feature between the first spectral image and at least one second spectral image other than the first spectral image of the plurality of spectral images acquired by the imaging element, (b) detecting a relative position shift amount between the first spectral image and the second spectral image, and (c) aligning the first spectral image and the second spectral image based on the relative position shift amount being detected. The aligning of (c) includes correcting a position of the second spectral image with respect to a position of the first spectral image based on the common feature. An interval between a center wavelength of a first transmission peak of the light corresponding to the first spectral image and a center wavelength of a second transmission peak of the light corresponding to the second spectral image is no more than twice a first full width at half maximum of the first transmission peak or a second full width at half maximum of the second transmission peak.

DESCRIPTION OF EXEMPLARY EMBODIMENTS

First, a configuration of a spectrometry system 1 will be described with reference to FIG. 1.

The spectrometry system 1 includes a spectrometer 2 and a terminal device 7, which are configured to be capable of communicating in an alternating manner. The spectrometry system 1 measures light (incident light) to be measured from an object X to be measured as a target object, and outputs a colorimetric result. The object X to be measured may be, for example, an image printed on a medium such as paper by a printing apparatus, an image displayed on a display such as a liquid crystal panel, or, not being limited to an image, a front surface of an object.

The spectrometer 2 is for capturing an image of the object X to be measured and acquiring a spectral image 200 (refer to FIG. 6), and includes a light sensor unit 3 configured to capture light to be measured from the object X to be measured, a printed wired board 6 provided with various hardware for controlling the spectrometer 2 (for example, an integrated circuit such as a central processing unit (CPU) and a memory), a light source 21, and a communication unit 22.

The light sensor unit 3 includes an optical filter device 4 in which a spectral element 5 (also referred to as a wavelength variable interference filter) is housed within the housing 40, an optical system 31 that guides the light to be measured to the spectral element 5, an imaging element 32 that receives light transmitted through the spectral element 5, and a voltage control unit 33 that varies a wavelength A of the light transmitted by the spectral element 5.

The optical system 31 is an optical system that guides incident light to the spectral element 5, and is constituted by optical components such as a plurality of lenses. This optical system 31 emits a main beam of incident light such that the main beam is parallel to the optical axis and orthogonal to a first substrate 51 (refer to FIG. 3) of the spectral element 5.

Figure 2:
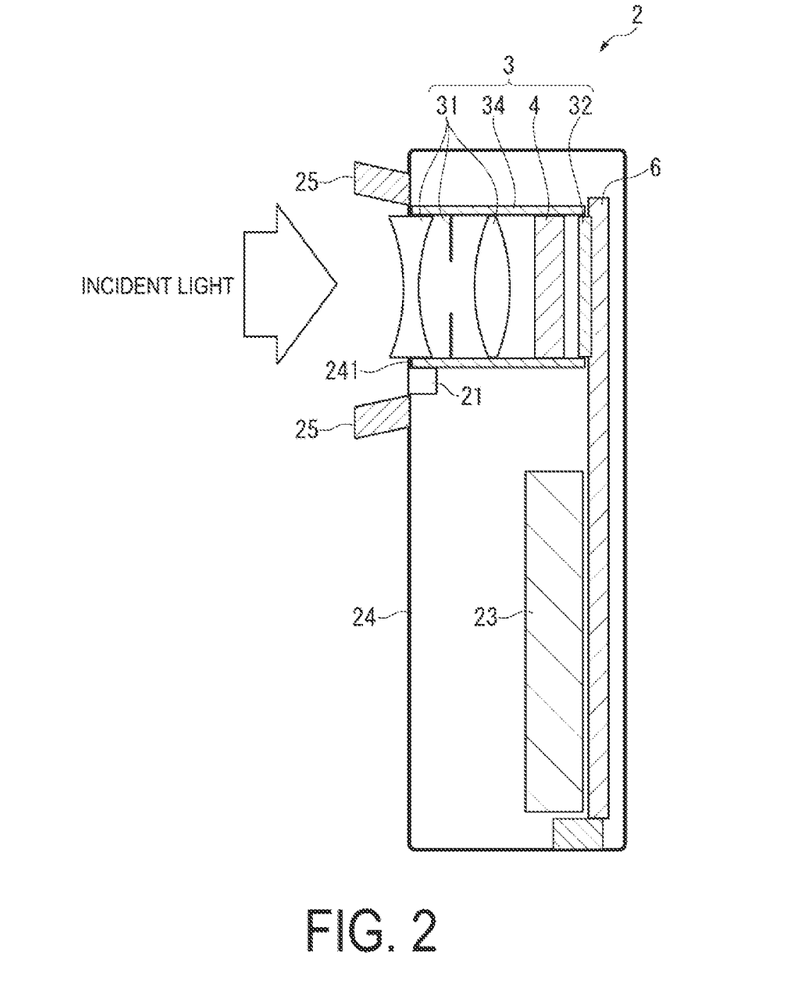
FIG. 2 is a cross-sectional view illustrating a configuration of the spectrometry system.

The imaging element 32 is provided on the printed wired board 6 so as to be positioned on a focal plane of the optical system 31 (refer to FIG. 2). The light to be measured emitted from the object X to be measured is guided by the optical system 31 and imaged in the imaging element 32. This imaging element 32 includes a plurality of detection elements (not illustrated) arrayed in an array. These detection elements are constituted by, for example, a photoelectric conversion element such as a charge-coupled device (CCD) or a complementary metal-oxide-semiconductor (CMOS), generate an electrical signal in accordance with the amount of light received, and output the electrical signal to a light amount acquisition unit 63 described below.

In accordance with the control of a filter control unit 62 described below, the voltage control unit 33 applies, to the spectral element 5, a drive voltage corresponding to the wavelength A (measurement wavelength) of the light transmitted by the spectral element 5.

The printed wired board 6 includes various control units for controlling the spectrometer 2. Specifically, the printed wired board 6 is provided with a storage unit 61, the filter control unit 62, the light amount acquisition unit 63, and a light source control unit 64. The various control units provided on this printed wired board 6 are configured by combining as appropriate an arithmetic circuit, a memory, various electrical circuits, and the like.

The storage unit 61 stores various programs as computer programs for controlling the spectrometer 2, and various data. The various data are, for example, V-λ data indicating the wavelength A of the transmitted light with respect to the drive voltage applied to an electrostatic actuator 56 (refer to FIG. 3), and information related to the measurement wavelength (measurement start wavelength, change interval of wavelength A, measurement end wavelength, and the like) when the object X to be measured is measured. Further, the storage unit 61 stores the amount of light acquired by the light amount acquisition unit 63 as the spectral image 200 associated with a pixel position (coordinate value) of each detection element and the measurement wavelength at the time of detection.

The filter control unit 62 acquires, on the basis of the V-λ data stored in the storage unit 61, a voltage value (input value) of the drive voltage corresponding to the measurement wavelength, outputs the acquired voltage value to the voltage control unit 33, and varies a size of the gap of the spectral element 5. Further, the filter control unit 62 detects a change timing of the measurement wavelength, changes the measurement wavelength, changes the drive voltage corresponding to the change in the measurement wavelength, determines the end of measurement, and the like on the basis of the various data stored in the storage unit 61, and controls the voltage control unit 33 on the basis of the determination.

The light amount acquisition unit 63 acquires the spectral image 200 by acquiring the received amount of transmitted light for each detection element of the imaging element 32. The spectral image 200, in which the pixel position and the amount of received light are correlated, is associated with the measurement wavelength at the time of detection and stored in the storage unit 61. Note that the imaging element 32 and the light amount acquisition unit 63 correspond to the imaging unit of the present disclosure.

The light source control unit 64 controls the on and off states of the light source 21 in accordance with an instruction from a user. The light source 21 is a light source of a light-emitting diode (LED) or the like that emits white and violet color light, for example.

The communication unit 22 communicates with the terminal device 7 and other external devices. The communication unit 22 is configured to be capable of communicating by wired communication via a local area network (LAN) or the like, and by various types of wireless communication such as Wi-Fi (trade name), Bluetooth (trade name), and infrared communication.

The terminal device 7 includes a display unit 71, an input unit 72, a communication unit 73, and a control unit 74 as a computer for controlling the terminal device 7.

The display unit 71 is a display device such as a liquid crystal display or an organic electroluminescent (EL) display. The input unit 72 inputs an operation instruction by the user into the control unit 74. Examples of the input unit 72 include various touch panels, such as infrared, capacitive, and electromagnetic inductive, capable of detecting an operation by the user on a front surface of the display unit 71, and various input devices such as a mouse and a keyboard. The communication unit 73 communicates with the spectrometer 2 and other external devices. The communication unit 72 is configured to be capable of communicating by wired communication via a LAN or the like, and by various types of wireless communication such as Wi-Fi, Bluetooth, and infrared communication.

The control unit 74 includes various control units for controlling the terminal device 7 and the spectrometry system 1, specifically, a display control unit 741, an alignment point selection unit 742, a position shift amount detector 743, and an alignment unit 744. The various control units provided to this control unit 74 are configured by combining as appropriate an arithmetic circuit, a memory, various electrical circuits, and the like.

The display control unit 741 controls display contents of the display unit 71. As the display contents, a reference image obtained by synthesizing the spectral image 200 captured by the spectrometry device 2 is exemplified. Other display contents are, for example, an operation screen for operating the spectrometry system 1, and a notification image for notifying the user of an operation state, measurement results, and the like of the spectrometer 2.

The alignment point selection unit 742 selects, on the basis of a received light intensity of each pixel of the spectral image 200, an alignment point to serve as reference when aligning a plurality of the spectral images 200 acquired by the spectrometer 2. In this exemplary embodiment, one pixel of adjacent pixels having the largest difference in received light intensity is set as the alignment point. The method of selecting the alignment point by the alignment point selection unit 742 will be described in detail below.

The position shift amount detector 743 detects a shift amount of each spectral image 200 at the time of alignment in the basis of the alignment point selected by the alignment point selection unit 742. In this exemplary embodiment, the position shift amount detector 743 detects a relative position shift amount so that, in the spectral images 200 of a plurality of measurement wavelengths, the alignment points of the spectral images 200 having the closest measurement wavelengths are relatively coincident. Detection of the position shift amount by the position shift amount detector 743 will be described in detail below.

The alignment unit 744 aligns the spectral images 200 on the basis of the relative position shift amount detected by the position shift amount detector 743.

Next, a configuration of the spectrometer 2 will be described with reference to FIG. 2.

As illustrated in FIG. 2, the spectrometer 2 includes the light sensor unit 3 configured to capture light to be measured from the object X to be measured, the printed wired board 6 provided with various hardware for controlling the spectrometer 2, the light source 21, the communication unit 22 (refer to FIG. 1), and a battery 23, and these members are accommodated in an outer case 24.

A light incident port 241 for capturing the light to be measured in the light sensor unit 3 is formed in the outer case 24, and a light-shielding portion 25 having a cylindrical shape protruding from the outer case 24 is provided around the light incident port 241. This light-shielding portion 25 is a member having a light-shielding property that adheres to a front surface of the object X to be measured, thereby suppressing entry of light other than the light to be measured into the light incident port 241. Note that the light-shielding portion 25 is formed from a hard member that does not elastically deform, for example. As a result, it is easy to fix the spectrometer 2 to the object X to be measured.

As described above, the light sensor unit 3 includes the optical filter device 4 in which the spectral element 5 is housed within the housing 40, the optical system 31 that guides the light to be measured to the spectral element 5 (refer to FIG. 1), the imaging element 32 that receives light transmitted through the spectral element 5, and the voltage control unit 33 (refer to FIG. 1) that varies the wavelength λ of the light transmitted by the spectral element 5.

The optical filter device 4, the optical system 31, and the imaging element 32 are disposed at predetermined positions in an optical component housing 34 open at both ends. The imaging element 32 is disposed at an end portion of the optical component housing 34 on the printed wired board 6 side, and an optical component constituting the optical system 31 is disposed at an end portion on the opposite side. The end portion on the opposite side is coupled to the light incident port 241 formed in the outer case 24.

Figure 1:
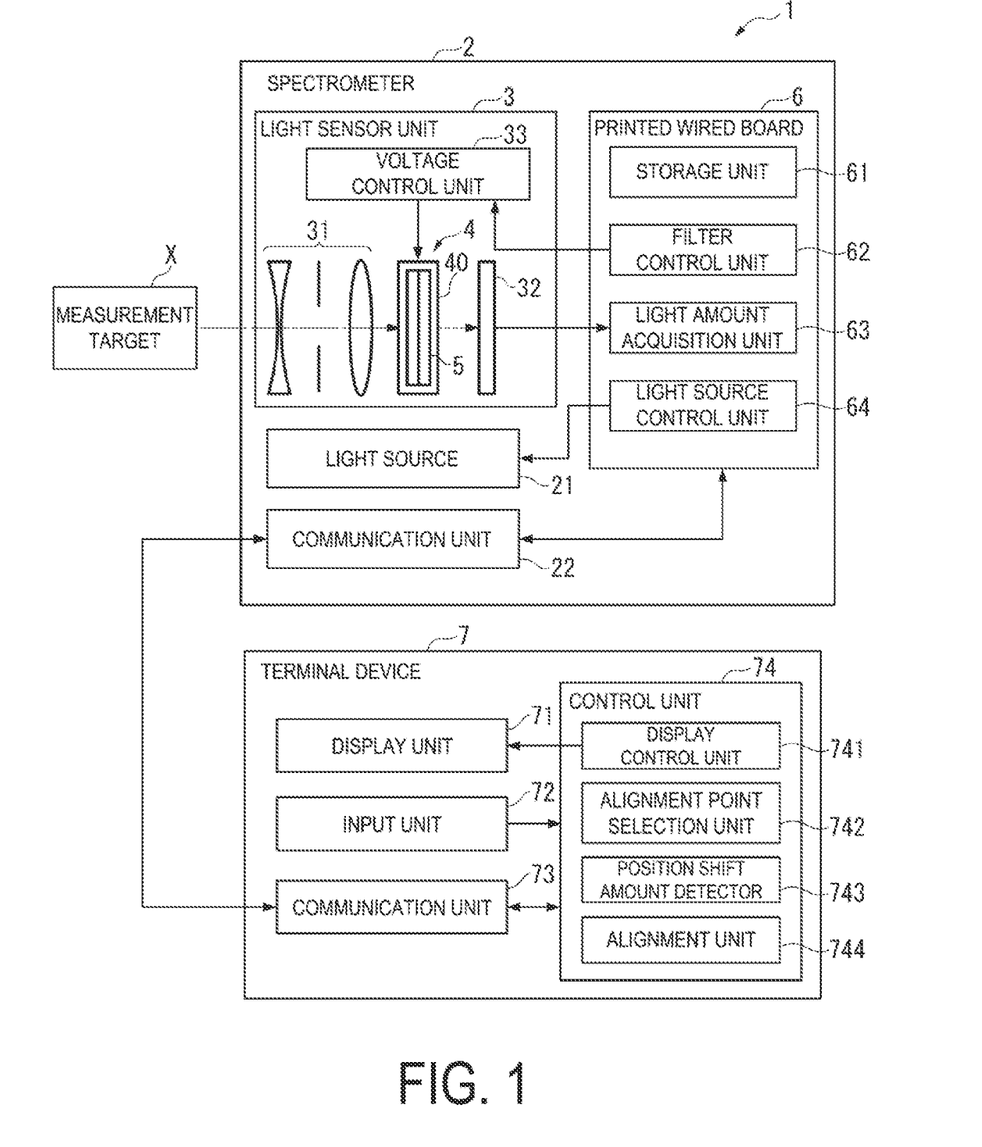
FIG. 1 is a block diagram illustrating a configuration of a spectrometry system.

As illustrated in FIG. 1, the printed wired board 6 is provided with the storage unit 61, the filter control unit 62, the light amount acquisition unit 63, and the light source control unit 64.

The light source 21 is provided in a region around the light incident port 241 of the outer case 24 and surrounded by the light-shielding portion 25. This light source 21 emits light toward the object X to be measured, and the spectrometer 2 measures the reflected light.

The battery 23 is a power source that supplies power to the spectrometer 2, and is a secondary battery configured to be rechargeable by a charging circuit (not illustrated). Note that the spectrometer 2 may be configured to be capable of being coupled to an external device, such as the terminal device 7, and receive a supply of power from the external device.

Next, a configuration of the spectral element 5 will be described with reference to FIG. 3.

Figure 3:
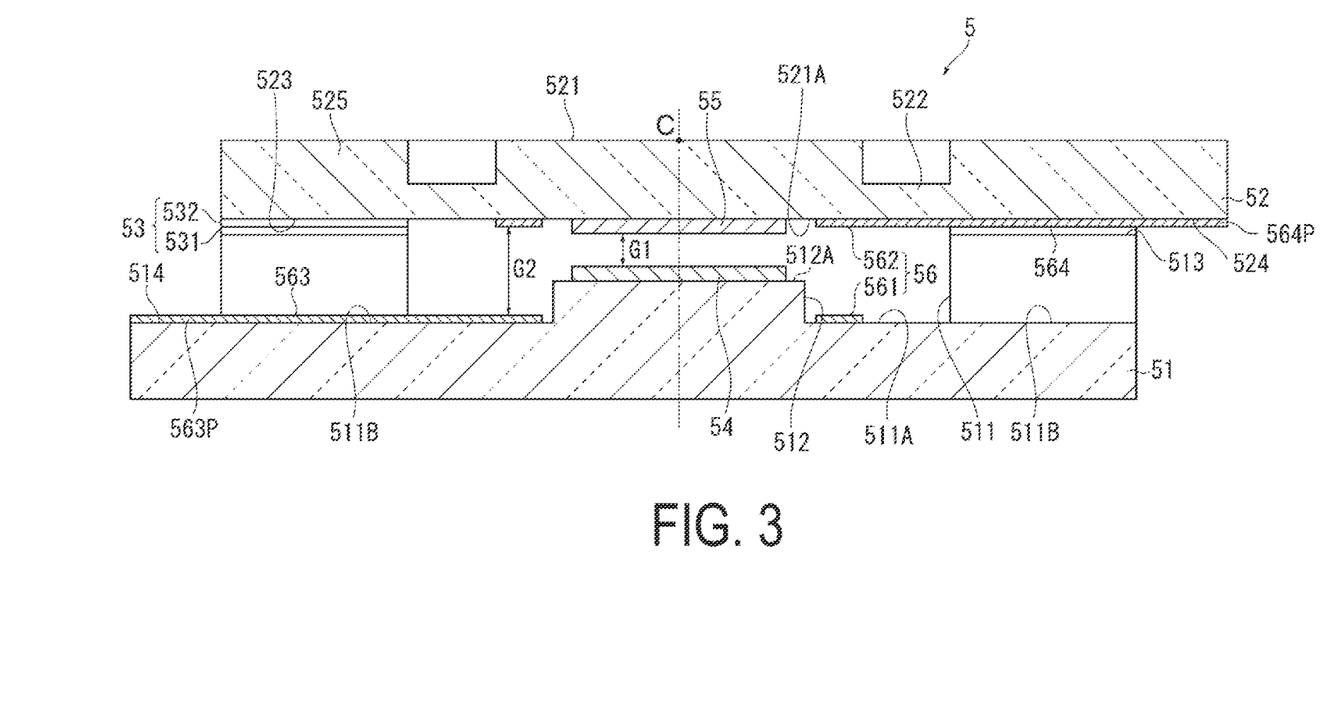
FIG. 3 is a cross-sectional view illustrating the configuration of the spectrometry system.

As illustrated in FIG. 3, the spectral element 5 is accommodated in the housing 40 (refer to FIG. 1), and an interior of the housing 40 is an enclosed space. Specifically, the enclosed space is maintained in a vacuum environment (or an environment de-pressurized lower than atmospheric pressure).

The spectral element 5 includes the first substrate 51 and a second substrate 52. The first substrate 51 and the second substrate 52 are integrally configured by a first bonding portion 513 of the first substrate 51 and a second bonding portion 523 of the second substrate 52 being bonded by a bonding film 53 (first bonding film 531 and second bonding film 532) constituted by, for example, a plasma polymerization film having a siloxane as a main component.

Note that a direction viewed from a thickness direction of the first substrate 51 or the second substrate 52, that is, a direction viewed from a stacking direction of the first substrate 51, the bonding film 53, and the second substrate 52, is referred to as plan view.

In plan view, one side of the first substrate 51 protrudes outward of the second substrate 52. Of this protruding portion, a surface exposed when the spectral element 5 is viewed from the second substrate 52 side constitutes a first electrical surface 514. Further, in plan view, of the sides of the second substrate 52, one side facing the first electrical surface 514 protrudes outward of the first substrate 51. Of this protruding portion, a surface exposed when the spectral element 5 is viewed from the first substrate 51 side constitutes a second electrical surface 524.

An electrode arrangement groove 511 and a reflective film installation portion 512 are formed on the first substrate 51. This first substrate 51 is formed with a large thickness dimension with respect to the second substrate 52, and is free of electrostatic attraction when voltage is applied between a first electrode 561 and a second electrode 562 as well as bending of the first substrate 51 caused by internal stress of the first electrode 561.

The electrode arrangement groove 511 is formed in an annular shape with a center point C of the spectral element 5 at the center, in plan view. The reflective film installation portion 512 is formed so as to protrude from a center portion of the electrode arrangement groove 511 toward the second substrate 52, in plan view. Here, a groove bottom surface of the electrode arrangement groove 511 is an electrode installation surface 511A on which the first electrode 561 is disposed. Further, a protruding tip surface of the reflective film installation portion 512 is a reflective film installation surface 512A on which a fixed reflective film 54 is installed.

Further, the first substrate 51 is provided with an electrode lead-out groove 511B extending from the electrode arrangement groove 511 toward the first electrical surface 514 and the second electrical surface 524.

The electrode installation surface 511A of the electrode arrangement groove 511 is provided with the first electrode 561. This first electrode 561 is provided in a region of the electrode installation surface 511A that faces the second electrode 562 of a movable unit 521 described below. The first substrate 51 is then provided with a fixed lead-out electrode 563 that extends from an outer peripheral edge of the first electrode 561 through the electrode lead-out groove 511B having an annular shape to the first electrical surface 514. The extended tip portion of this fixed lead-out electrode 563 constitutes a fixed electrode pad 563P on the first electrical surface 514.

Note that, in this exemplary embodiment, a configuration is illustrated in which one first electrode 561 is provided on the electrode installation surface 511A, but the configuration may be, for example, one in which two electrodes concentric about the plane center point C are provided (dual electrode configuration).

Then, of the surfaces of the first substrate 51 that face the second substrate 52, the surface on which the electrode arrangement groove 511, the reflective film installation portion 512, and the electrode lead-out groove 511B are not formed constitutes the first bonding portion 513. This first bonding portion 513 is provided with the first bonding film 531, and this first bonding film 531 is bonded to the second bonding film 532 provided on the second substrate 52, thereby bonding the first substrate 51 and the second substrate 52 as described above.

In plan view, the second substrate 52 includes the movable unit 521 having a circular shape with the plane center point C at the center, a holding unit 522 provided outside the movable unit 521 and configured to hold the movable unit 521, and a substrate outer peripheral portion 525 provided outside the holding unit 522.

The movable unit 521 is formed with a larger thickness dimension than that of the holding unit 522. In plan view, this movable unit 521 is formed with a diameter dimension greater than a diameter dimension of at least an outer peripheral edge of the reflective film installation surface 512A. Then, this movable unit 521 is provided with the second electrode 562 and a movable reflective film 55.

The second electrode 562 is formed in an annular shape, facing the first electrode 561 with an inter-electrode gap G2 therebetween, and having the same shape as that of the first electrode 561. Further, the second substrate 52 is provided with a movable lead-out electrode 564 that extends from an outer peripheral edge of the second electrode 562 toward the second electrical surface 524. An extended tip portion of this movable lead-out electrode 564 constitutes a movable electrode pad 564P on the second electrical surface 524.

The movable reflective film 55 is provided in a center portion of a movable surface 521A of the movable unit 521 so as to face the fixed reflective film 54 and an inter-reflective-film gap G1.

The holding unit 522 is a diaphragm surrounding the movable unit 521, and is formed with a thickness dimension smaller than that of the movable unit 521. Such a holding unit 522 is more likely to bend than the movable unit 521, allowing the movable unit 521 to be displaced toward the first substrate 51 by a slight electrostatic attraction.

As described above, the substrate outer peripheral portion 525 is provided outside the holding unit 522 in plan view. A surface of this substrate outer peripheral portion 525 that faces the first substrate 51 includes the second bonding portion 523 facing the first bonding portion 513. Then, this second bonding portion 523 is provided with the second bonding film 532 and, as described above, the second bonding film 532 is bonded to the first bonding film 531, thereby bonding the first substrate 51 and the second substrate 52.

Next, a spectrometry method will be described with reference to FIG. 4 to FIG. 11A and FIG. 11B.

Figure 4:
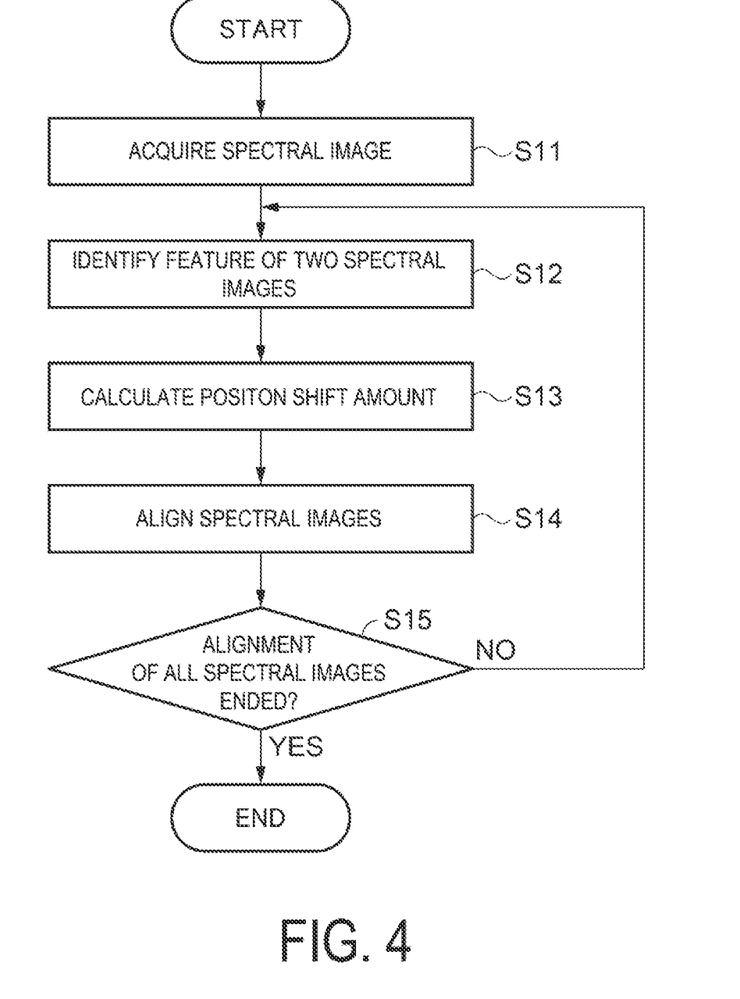
FIG. 4 is a flowchart illustrating a spectrometry method.

First, in step S11, the spectral image 200 is acquired. Specifically, the spectral image 200 is acquired for each predetermined wavelength A, that is, a plurality of the spectral images 200 are acquired.

In order to perform spectrometry processing by the spectrometry system 1, first, the filter control unit 62 refers to the V-A data stored in the storage unit 61 and reads the drive voltage corresponding to the measurement wavelength. Then, the filter control unit 62 controls the voltage control unit 33 and applies the drive voltage read to the electrostatic actuator 56 of the spectral element 5.

When the drive voltage is applied to the electrostatic actuator 56, the inter-reflective-film gap G1 between the reflective films 54, 55 is changed to a dimension corresponding to the drive voltage. Then, light of the measurement wavelength is transmitted through the spectral element 5 and detected by the imaging element 32, the spectral image 200 is acquired by the light amount acquisition unit 63, and the amount of received light, the pixel position, and the measurement wavelength are stored in the storage unit 61 in association with each other.

Figure 5:
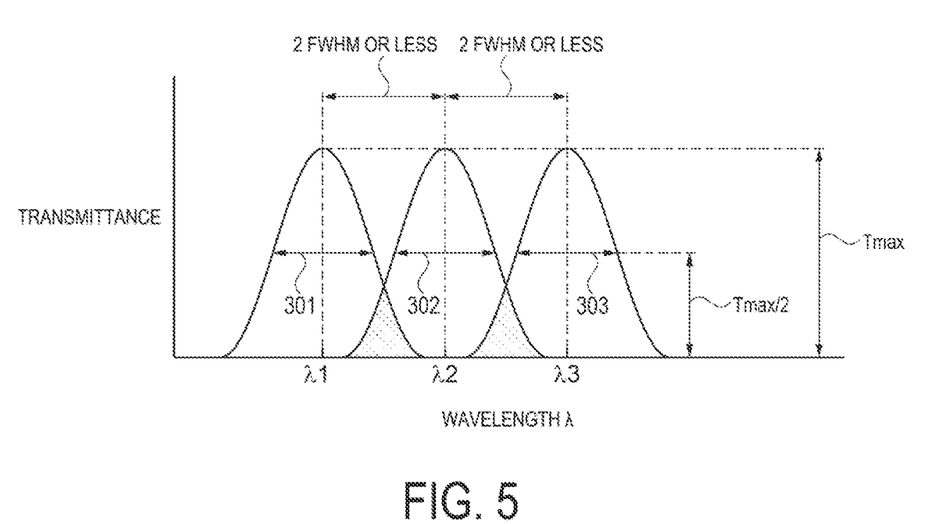
FIG. 5 is a diagram illustrating a spectral spectrum for each wavelength.

Here, the spectral image 200 of a first wavelength is referred to as a first spectral image 201. The spectral image 200 of a second wavelength is referred to as a second spectral image 202. The spectral image 200 of a third wavelength is referred to as a third spectral image 203. As illustrated in FIG. 5, the interval between a center wavelength $\lambda 1$ of a first transmission peak of light corresponding to the first spectral image 201 and a center wavelength $\lambda 2$ of a second transmission peak of light corresponding to the second spectral image 202 is no more than twice a first full width at half maximum 301 of the first transmission peak or a second full width at half maximum 302 of the second transmission peak.

FIG. 5 illustrates a transmission peak for each wavelength $\lambda$ of light transmitted through the spectral element 5. The horizontal axis illustrated in FIG. 5 indicates the wavelength $\lambda$, and here indicates three wavelengths, namely, the first wavelength $\lambda 1$, the second wavelength $\lambda 2$, and the third wavelength $\lambda 3$. The vertical axis illustrated in FIG. 5 indicates transmittance, and the transmittance increases from a lower side to an upper side.

The full width at half maximum (FWHM) is the width of the wavelength $\lambda$ at a transmission peak Tmax/2 of half of a transmission peak Tmax of the transmitted light. By capturing the spectral image 200 at a wavelength no more than twice the first full width at half maximum 301 or the second full width at half maximum 302, it is possible to acquire a region in which the interval between the first wavelength $\lambda 1$ and the second wavelength $\lambda 2$ is overlapped, that is, common features A, B (or features C, D) (refer to FIGS. 10A, 10B, 11A, and 11B).

Further, as illustrated in FIG. 5, the interval between the center wavelength $\lambda 2$ of the second transmission peak of light corresponding to the second spectral image 202 and a center wavelength $\lambda 3$ of a third transmission peak of light corresponding to the third spectral image 203 is no more than twice the second full width at half maximum 302 of the second transmission peak or a third full width at half maximum 303 of the third transmission peak.

By acquiring the spectral image 200 at such a wavelength interval, it is possible to acquire an overlapping region of the first spectral image 201 and the second spectral image 202 and thus acquire the common features A, B (refer to FIGS. 10A and 10B), for example. Thus, the position of the second spectral image 202 can be corrected and aligned to the position of the first spectral image 201 on the basis of the common features A, B.

Figure 11A:
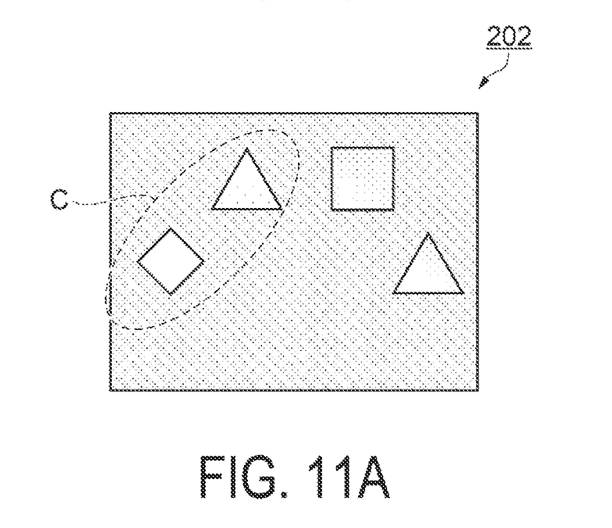
FIG. 11A is a diagram illustrating a method of correcting a position of the third spectral image.
Figure 11B:
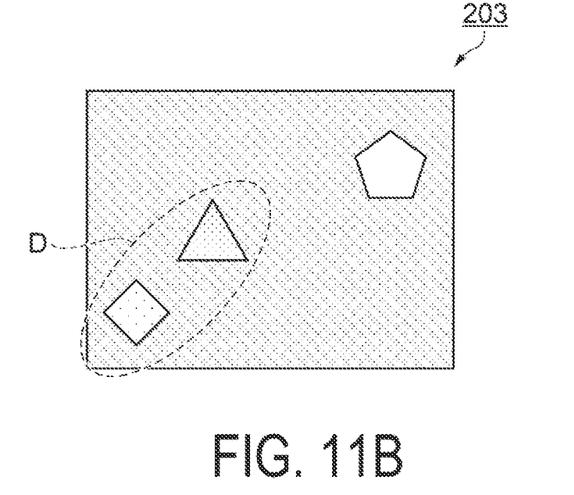
FIG. 11B is a diagram illustrates the method of correcting the position of the third spectral image.

Further, it is possible to acquire an overlapping region of the second spectral image 202 and the third spectral image 203 and thus acquire the common features C, D (refer to FIGS. 11A and 11B). Thus, the position of the third spectral image 203 can be corrected and aligned to the position of the second spectral image 202 on the basis of the common features C, D. In this way, alignment can be performed for all spectral images 200, and highly accurate spectral data can be acquired.

Figure 6:
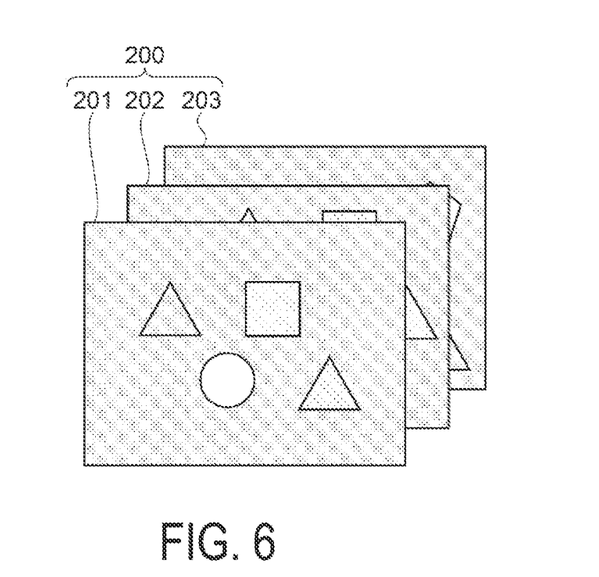
FIG. 6 is a diagram illustrating a spectral image acquired for each wavelength.
Figure 7:
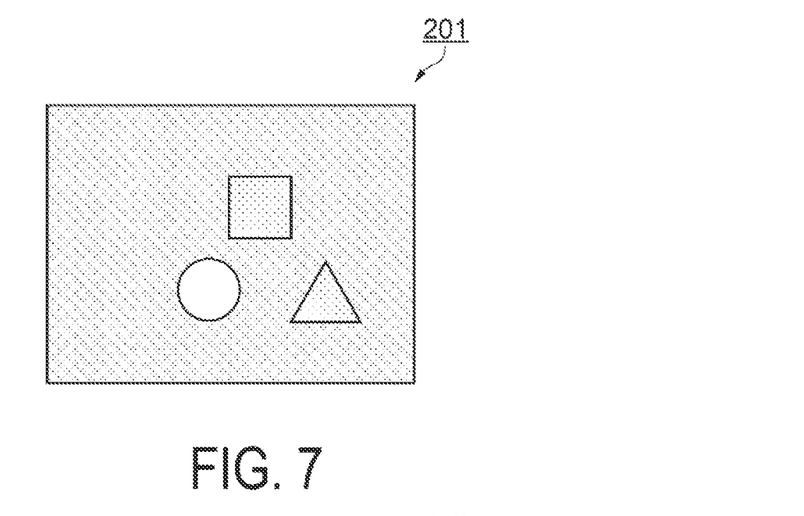
FIG. 7 is a diagram illustrating a first spectral image.
Figure 8:
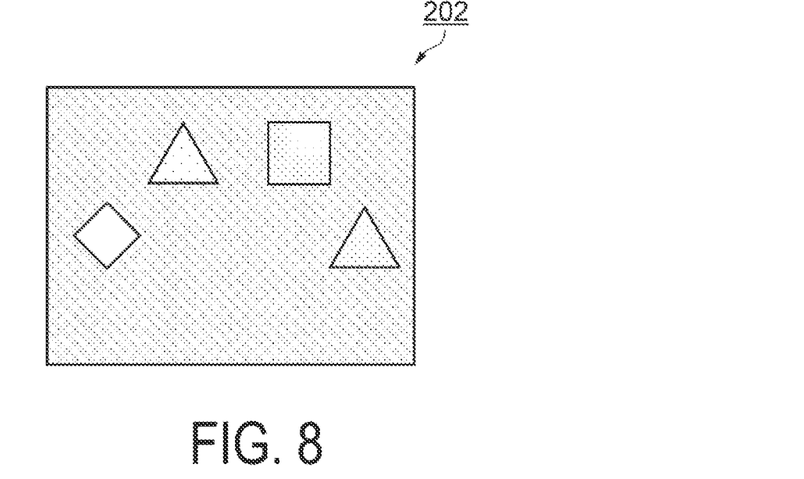
FIG. 8 is a diagram illustrating a second spectral image.
Figure 9:
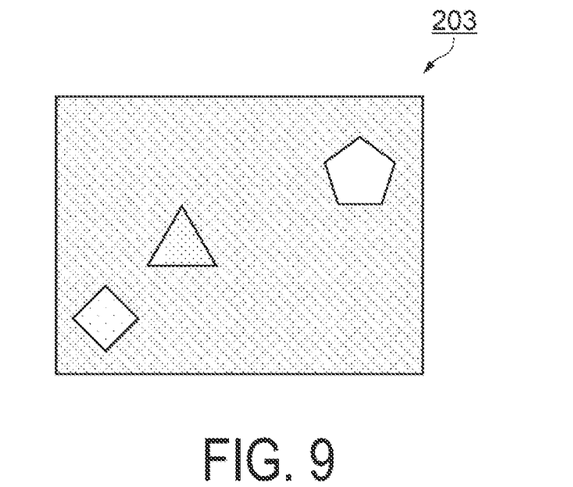
FIG. 9 is a diagram illustrating a third spectral image.

Note that FIG. 6 illustrates a plurality of the spectral images 200 acquired at the wavelength interval described above. FIG. 7 illustrates, of the acquired plurality of spectral images 200, the first spectral image 201 of the first wavelength. FIG. 8 illustrates, of the acquired plurality of spectral images 200, the second spectral image 202 of the second wavelength. FIG. 9 illustrates, of the acquired plurality of spectral images 200, the third spectral image 203 of the third wavelength. Note that, while only three spectral images 201, 202, 203 are illustrated in FIG. 6, in reality, there are as many spectral images 200 as the number of wavelengths to be measured.

Next, in step S12, the features A, B of the two spectral images 201, 202 are identified. Specifically, the common features A, B are identified by comparing the first spectral image 201 and the second spectral image 202, for example. As illustrated in FIG. 5, a portion of the waveform at a base of the first spectral image 201 and a portion of the waveform at a base of the second spectral image 202 overlap each other, and the common features A, B are included in both.

Figure 10A:
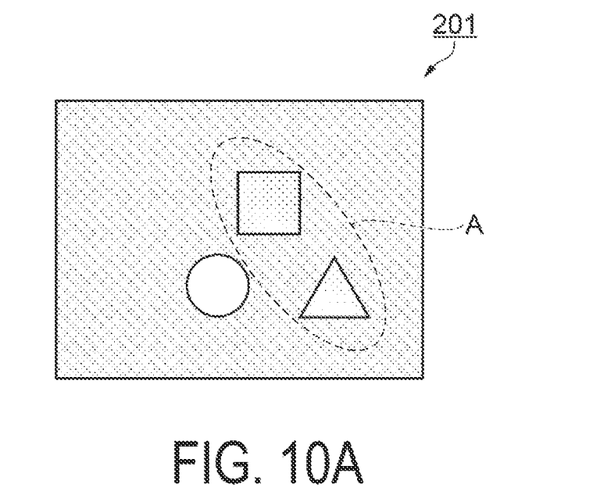
FIG. 10A is a diagram illustrating a method of correcting a position of the second spectral image.
Figure 10B:
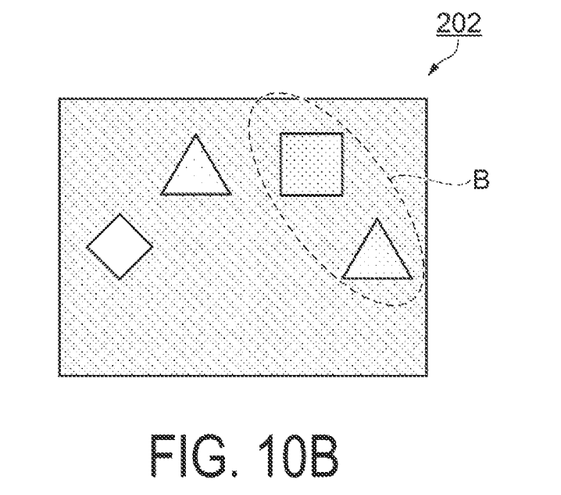
FIG. 10B is a diagram illustrating the method of correcting the position of the second spectral image.

The common features A, B are, for example, portions in which, when the first spectral image 201 and the second spectral image 202 are separated into a plurality of pixels, combination patterns of light intensity differences between adjacent pixels tend to be the same in a certain region. Specifically, as illustrated in FIGS. 10A and 10B, the common features A, B can be identified. Note that the method for identifying the common features A, B is not particularly limited and identification need only be achieved by using a known method. Note that when the common features A, B are identified, a combination of at least two shapes is preferably defined as a feature so that position shifts in a linear direction and a rotational direction can be handled.

In step S13, the position shift amount is calculated. Specifically, the position shift amount of the common features A, B of the first spectral image 201 and the second spectral image 202 is calculated. The cause of position shift may be, for example, a camera moving due to shaky hands or the like when the spectral image 200 is scanned. This causes the common features A, B to be relatively shifted. As the calculation method, for example, the second spectral image 202 is superimposed on the first spectral image 201 serving as a reference, and the shift amount is calculated on the basis of the difference between the coordinate values of the common features A, B.

The position shift amount detector 743 calculates the position shift amount of the first spectral image 201 and the second spectral image 202. Using this position shift amount, the alignment unit 744 performs processing for aligning the position of the second spectral image 202 with reference to the first spectral image 201. Subsequently, the corrected image is acquired and stored in a storage means such as a memory.

In step S14, the position shift of the spectral image 200 is adjusted. Specifically, in order to align the relative positions of the first spectral image 201 and the second spectral image 202, correction is made by, for example, translating the position of the second spectral image 202 with reference to the first spectral image 201 on the basis of the common features A, B.

As an alignment point (in other words, alignment reference point), for example, a pixel having the largest light intensity difference between adjacent pixels in the common features A, B is used. Note that the alignment point is not limited to the above, and another point may be defined as the reference point.

Note that the method of calculating the position shift amount is not particularly limited and may be, for example, a method of detecting the relative position shift amount by tracking the detected features A, B across two or more spectral images 200 by the Shift, SURF, ORB, or Canny method.

In step S15, it is determined whether alignment of all spectral images 200 has ended. When alignment of all spectral images 200 has ended, the processing of the spectrometry method is ended. When alignment has not ended, the processing proceeds to step S12 and the next spectral image 200 is aligned. For example, as described above, the position of the third spectral image 203 is corrected with reference to the position of the second spectral image 202 (refer to FIGS. 11A and 11B). In this manner, the processing is repeated until the alignment of all spectral images 200 has ended.

As described above, in the spectrometry method of this exemplary embodiment, there are provided the spectral element 5 configured to change the wavelength $\lambda$ of light to be selected and configured to disperse light from the object X to be measured, the imaging element 32 and the light amount acquisition unit 63 configured to receive light dispersed into a plurality of the wavelengths $\lambda$ by the spectral element 5 to acquire a plurality of the spectral images 200, the position shift amount detector 743 configured to detect a relative position shift amount between one first spectral image 201 and at least one second spectral image 202 other than the first spectral image 201 of the plurality of spectral images 200 acquired by the imaging element 32 and the light amount acquisition unit 63, and the alignment unit 744 configured to align the first spectral image 201 and the second spectral image 202 based on the relative position shift amount detected by the position shift amount detector 743. The interval between the center wavelength $\lambda 1$ of the first transmission peak of the light corresponding to the first spectral image 201 and the center wavelength $\lambda 2$ of the second transmission peak of the light corresponding to the second spectral image 202 is no more than twice the first full width at half maximum 301 of the first transmission peak or the second full width at half maximum 302 of the second transmission peak. The spectrometry method includes identifying the common features A, B of the first spectral image 201 and the second spectral image 202, and correcting the position of the second spectral image 202 with respect to the position of the first spectral image 201 based on the common features A, B.

According to this method, the first spectral image 201 and the second spectral image 202 are acquired so that the interval is no more than twice the first full width at half maximum 301 or the second full width at half maximum 302, making it possible to acquire the common features A, B of the first spectral image 201 and the second spectral image 202. Thus, the position of the second spectral image 202 can be corrected and aligned to the position of the first spectral image 201 on the basis of the common features A, B. As a result, alignment can be performed for all spectral images 200, and highly accurate spectral data can be acquired. In addition, analysis can be performed correctly on the basis of the acquired spectral data.

Further, the spectrometry system 1 of this exemplary embodiment includes the spectral element 5 configured to change the wavelength $\lambda$ of light to be selected and configured to disperse light from the object X to be measured, the imaging element 32 and the light amount acquisition unit 63 configured to receive light dispersed into a plurality of the wavelengths $\lambda$ by the spectral element 5 to acquire a plurality of the spectral images 200, the position shift amount detector 743 configured to detect a relative position shift amount between one first spectral image 201 and at least one second spectral image 202 other than the first spectral image 201 of the plurality of spectral images 200 acquired by the imaging element 32 and the light amount acquisition unit 63, and the alignment unit 744 configured to align the first spectral image 201 and the second spectral image 202 based on the relative position shift amount detected by the position shift amount detector 743. The interval between the center wavelength $\lambda 1$ of the first transmission peak of the light corresponding to the first spectral image 201 and the center wavelength $\lambda 2$ of the second transmission peak of the light corresponding to the second spectral image 202 is no more than twice the first full width at half maximum 301 of the first transmission peak or the second full width at half maximum 302 of the second transmission peak.

According to this configuration, the first spectral image 201 and the second spectral image 202 are acquired so that the interval is no more than twice the first full width at half maximum 301 or the second full width at half maximum 302, making it possible to acquire the common features A, B of the first spectral image 201 and the second spectral image 202. Thus, the position of the second spectral image 202 can be corrected and aligned to the position of the first spectral image 201 on the basis of the common features A, B. As a result, alignment can be performed for all spectral images 200, and highly accurate spectral data can be acquired.

Further, the computer program of this exemplary embodiment is configured to cause a computer (control unit 74), which includes the spectral element 5 configured to change the wavelength $\lambda$ of light to be selected and configured to disperse light from the object X to be measured, the imaging element 32 and the light amount acquisition unit 63 configured to receive light dispersed into a plurality of the wavelengths $\lambda$ by the spectral element 5 to acquire a plurality of the spectral images 200, the position shift amount detector 743 configured to detect a relative position shift amount between one first spectral image 201 and at least one second spectral image 202 other than the first spectral image 201 of the plurality of spectral images 200 acquired by the imaging element 32 and the light amount acquisition unit 63, and the alignment unit 744 configured to align the first spectral image 201 and the second spectral image 202 based on the relative position shift amount detected by the position shift amount detector 743, the interval between the center wavelength $\lambda 1$ of the first transmission peak of the light corresponding to the first spectral image 201 and the center wavelength $\lambda 2$ of the second transmission peak of the light corresponding to the second spectral image 202 being no more than twice the first full width at half maximum 301 of the first transmission peak or the second full width at half maximum 302 of the second transmission peak, to execute a process of identifying the common features A, B of the first spectral image 201 and the second spectral image 202, and a process of correcting the position of the second spectral image 202 with respect to the position of the first spectral image 201 based on the common features A, B.

According to this configuration, the first spectral image 201 and the second spectral image 202 are acquired so that the interval is no more than twice the first full width at half maximum 301 or the second full width at half maximum 302, making it possible to acquire the common features A, B of the first spectral image 201 and the second spectral image 202. Thus, the position of the second spectral image 202 can be corrected and aligned to the position of the first spectral image 201 on the basis of the common features A, B. As a result, alignment can be performed for all spectral images 200, and highly accurate spectral data can be acquired.

Below, modified examples of the exemplary embodiment described above will be described.

The method of correcting the second spectral image 202 with respect to the first spectral image 201 is not limited to translating the position as in the exemplary embodiment described above, and the correction may include any or all of position, rotation, and scaling, for example.

According to this method, correction including position, rotation, and scaling is performed, making it possible to align the second spectral image 202 with the first spectral image 201.

Figure 12:
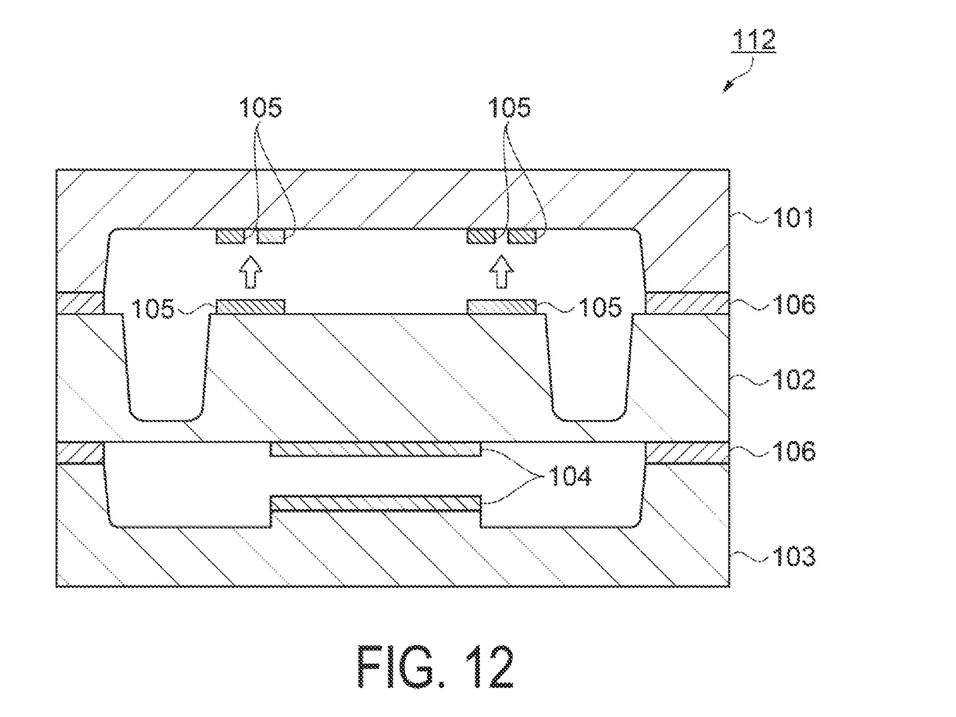
FIG. 12 is a cross-sectional view illustrating a configuration of a spectral element of a modified example.

Further, the spectral element 5 is not limited to the configuration described above, and may be configured as illustrated in FIG. 12. FIG. 12 is a cross-sectional view illustrating a structure of a spectral element 112 of a modified example. The spectral element 112 of the modified example differs from the spectral element 5 of the exemplary embodiment described above in a portion constituted by a first substrate 101, a second substrate 102, and a third substrate 103.

As illustrated in FIG. 12, in the spectral element 112 of the modified example, the first substrate 101, the second substrate 102, and the third substrate 103 are, for example, bonded together via a bonding layer 106 as described above. A pair of reflective films 104 are disposed on surfaces of the second substrate 102 and the third substrate 103 that face each other. Electrostatic actuators 105 configured to change a gap size of the reflective films 104 are disposed on surfaces of the first substrate 101 and the second substrate 102 that face each other. In such a structure as well, the spectral element 112 having a function similar to that of the spectral element 5 described above can be provided.

Further, the spectrometry system 1 has a configuration that includes the spectrometer 2 and the terminal device 7, but is not limited thereto and may have a configuration in which image processing such as described above can be performed by a single spectral camera such as the light sensor unit 3.

What is claimed is:

1. A spectrometry method in a spectrometer which includes
   a spectral element configured to change a wavelength of light to be selected and configured to disperse light from a target object, and
   an imaging element configured to receive light dispersed into a plurality of wavelengths by the spectral element to acquire a plurality of spectral images, the spectrometry method comprising:
   (a) identifying a common feature between a first spectral image and a second spectral image other than the first spectral image of the plurality of spectral images acquired by the imaging element;
   (b) detecting a relative position shift amount between the first spectral image and the second spectral image; and
   (c) aligning the first spectral image and the second spectral image based on the relative position shift amount being detected, wherein
   the alignment of (c) includes correcting a position of the second spectral image with respect to a position of the first spectral image based on the common feature, and
   an interval between a center wavelength of a first transmission peak of light corresponding to the first spectral image and a center wavelength of a second transmission peak of light corresponding to the second spectral image is no more than twice a first full width at half maximum of the first transmission peak or a second full width at half maximum of the second transmission peak.

2. The spectrometry method according to claim 1, wherein the correction includes any or all of the position, rotation, and scaling.

3. A spectrometry system, comprising:
   a spectral element configured to change a wavelength of light to be selected and configured to disperse light from a target object;
   an imaging element configured to receive light dispersed into a plurality of wavelengths by the spectral element to acquire a plurality of spectral images; and
   one or a plurality of processors configured to:
   (a) identify a common feature between a first spectral image and a second spectral image other than the first spectral image of the plurality of spectral images acquired by the imaging element;
   (b) detect a relative position shift amount between the first spectral image and the second spectral image; and
   (c) align the first spectral image and the second spectral image based on the relative position shift amount being detected, wherein
   the alignment of (c) includes correcting a position of the second spectral image with respect to a position of the first spectral image based on the common feature, and
   an interval between a center wavelength of a first transmission peak of light corresponding to the first spectral image and a center wavelength of a second transmission peak of light corresponding to the second spectral image is no more than twice a first full width at half maximum of the first transmission peak or a second full width at half maximum of the second transmission peak.

4. A non-transitory computer-readable storage medium storing instructions which, when executed by one or a plurality of processors to execute a spectrometry method including:
   a spectral element configured to change a wavelength of light to be selected and configured to disperse light from a target object, and
   an imaging element configured to receive light dispersed into a plurality of wavelengths by the spectral element to acquire a plurality of spectral images,
   the spectrometry method comprising:
   (a) identifying a common feature between a first spectral image and a second spectral image other than the first spectral image of the plurality of spectral images acquired by the imaging element;
   (b) detecting a relative position shift amount between the first spectral image and the second spectral image; and
   (c) aligning the first spectral image and the second spectral image based on the relative position shift amount being detected, wherein
   the alignment of (c) includes correcting a position of the second spectral image with respect to a position of the first spectral image based on the common feature, and
   an interval between a center wavelength of a first transmission peak of light corresponding to the first spectral image and a center wavelength of a second transmission peak of light corresponding to the second spectral image is no more than twice a first full width at half maximum of the first transmission peak or a second full width at half maximum of the second transmission peak.

* * * * *